United States Patent
Bui et al.

(10) Patent No.: US 10,283,153 B2
(45) Date of Patent: May 7, 2019

(54) TAPE DAMAGE DETECTION

(71) Applicant: International Business Machines Corporation, Armonk, NY (US)

(72) Inventors: Nhan X. Bui, Tucson, AZ (US); Randy C. Inch, Tucson, AZ (US); David L. Swanson, Tucson, AZ (US); Tomoko Taketomi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/036,821

(22) Filed: Jul. 16, 2018

(65) Prior Publication Data

US 2018/0322898 A1 Nov. 8, 2018

Related U.S. Application Data

(63) Continuation of application No. 14/815,901, filed on Jul. 31, 2015, now Pat. No. 10,068,599.

(51) Int. Cl.
| | | |
|---|---|---|
| *G11B 5/58* | (2006.01) | |
| *G11B 5/584* | (2006.01) | |
| *G11B 5/008* | (2006.01) | |
| *G11B 5/02* | (2006.01) | |

(52) U.S. Cl.
CPC .......... *G11B 5/584* (2013.01); *G11B 5/00826* (2013.01); *G11B 5/02* (2013.01)

(58) Field of Classification Search
CPC ..... G11B 5/008; G11B 5/00813; G11B 15/02; G11B 15/04; G11B 15/05; G11B 15/087; G11B 15/088; G11B 5/58; G11B 5/584
USPC .......... 360/31, 53, 55, 60, 61, 62, 63, 77.01, 360/77.12
See application file for complete search history.

(56) References Cited

U.S. PATENT DOCUMENTS

| | | | |
|---|---|---|---|
| 5,828,514 A | 10/1998 | Chliwnyj et al. | |
| 5,872,672 A | 2/1999 | Chliwnyj et al. | |
| 6,101,060 A | 8/2000 | Wojciechowski et al. | |
| 6,545,834 B1 | 4/2003 | Melbye | |
| 6,690,535 B2 | 2/2004 | Wang | |

(Continued)

OTHER PUBLICATIONS

Bui et al., U.S. Appl. No. 12/686,302, filed Jan. 12, 2010.

(Continued)

*Primary Examiner* — Nabil Z Hindi
(74) *Attorney, Agent, or Firm* — Zilka-Kotab, P.C.

(57) ABSTRACT

In one general embodiment, a method includes calculating a differential position value based on readback signals from at least two servo readers of a magnetic head reading servo tracks of a magnetic recording tape. The differential position value is compared to a previously-calculated differential position value. An action is performed in response to determining that the difference between the differential position value and the previously-calculated differential position value is in a predefined range. The differential position value is an average of differential position values for a set of samples, wherein the previously-calculated differential position value is an average of previously-calculated differential position values for a set of previously-obtained samples. In another general embodiment, an apparatus includes a magnetic head having servo readers and a controller in communication with the servo readers. The controller is configured to detect a sudden change in a width of a magnetic recording tape.

19 Claims, 10 Drawing Sheets

(56) References Cited

U.S. PATENT DOCUMENTS

| | | |
|---|---|---|
| 6,914,744 B1 | 7/2005 | Wang |
| 7,486,464 B2 | 2/2009 | Saliba |
| 7,859,786 B2 | 12/2010 | Saliba |
| 8,094,402 B2 | 1/2012 | Bui et al. |
| 8,711,501 B2 | 4/2014 | Childers et al. |
| 8,896,948 B2 | 11/2014 | Childers et al. |
| 8,896,958 B2 | 11/2014 | Fasen et al. |
| 8,982,492 B2 | 3/2015 | Bui et al. |
| 9,013,826 B1 | 4/2015 | Herget |
| 9,153,280 B2 | 10/2015 | Bui et al. |
| 9,183,863 B2 | 11/2015 | Herget |
| 9,299,375 B2 | 3/2016 | Herget |
| 10,068,599 B2 | 9/2018 | Bui et al. |
| 2011/0170214 A1 | 7/2011 | Bui et al. |
| 2017/0032817 A1 | 2/2017 | Bui et al. |

OTHER PUBLICATIONS

Bui et al., U.S. Appl. No. 14/815,901, filed Jul. 31, 2015.
Non-Final Office Action from U.S. Appl. No. 14/815,901, dated Jul. 26, 2017.
Final Office Action from U.S. Appl. No. 14/815,901, dated Jan. 26, 2018.
Notice of Allowance from U.S. Appl. No. 14/815,901, dated Apr. 25, 2018.
List of IBM Patents or Patent Applications Treated as Related.

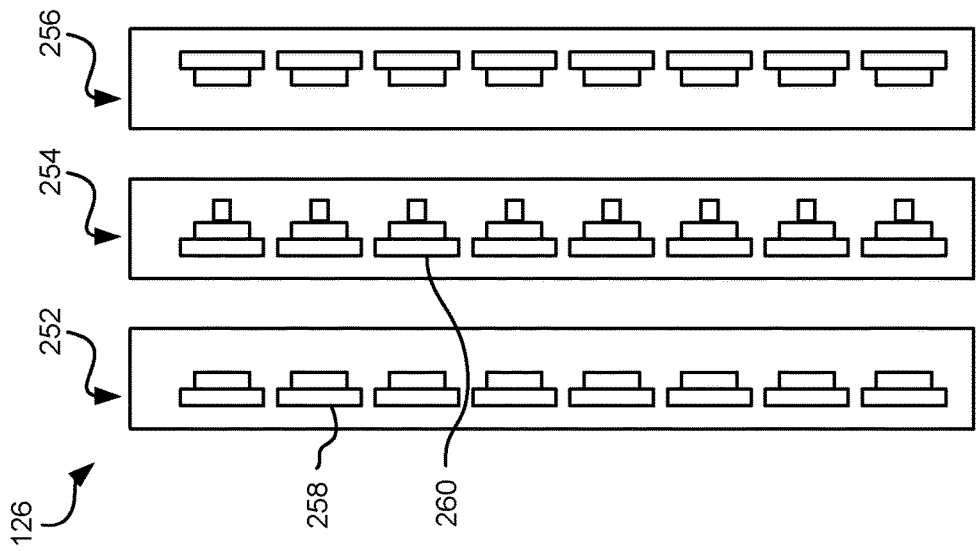
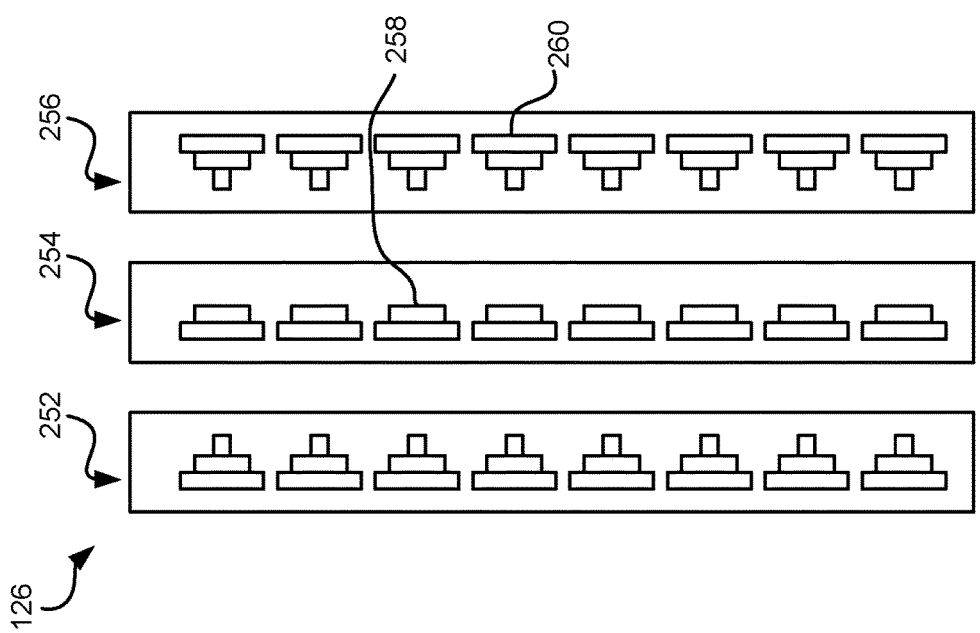

TAPE DAMAGE DETECTION

BACKGROUND

The present invention relates to data storage systems, and more particularly, this invention relates to tape damage detection and error handling in view thereof.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A method according to one embodiment includes calculating a differential position value based on readback signals from at least two servo readers of a magnetic head reading servo tracks of a magnetic recording tape. The differential position value is compared to a previously-calculated differential position value. An action is performed in response to determining that the difference between the differential position value and the previously-calculated differential position value is in a predefined range. The differential position value is an average of differential position values for a set of samples, wherein the previously-calculated differential position value is an average of previously-calculated differential position values for a set of previously-obtained samples.

An apparatus according to one embodiment includes a magnetic head having at least two servo readers, and a controller in communication with the servo readers. The controller is configured to detect a sudden change in a width of a magnetic recording tape based on a differential position value derived from relatively more current servo readback data and a second differential position value derived from relatively older servo readback data. The differential position value is an average of differential position values for a set of samples, wherein the previously-calculated differential position value is an average of previously-calculated differential position values for a set of previously-obtained samples.

A computer program product for detecting tape damage, according to one embodiment, includes a computer readable storage medium having program instructions embodied therewith, the program instructions executable by a controller to cause the controller to calculate a differential position value based on readback signals from at least two servo readers of a magnetic head reading servo tracks of a magnetic recording tape. The differential position value is compared to a previously-calculated differential position value. An action is performed in response to determining that the difference between the differential position value and the previously-calculated differential position value is in a predefined range. The difference being in the predefined range is indicative of a stretching or an expansion of only a portion of the magnetic recording tape.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments include systems and methods that detect tape damage such as a stretched region and/or an exceptionally expanded region of tape. Procedures for dealing with such damages sections of tape are also provided by some embodiments.

In one general embodiment, a method includes calculating a differential position value based on readback signals from at least two servo readers of a magnetic head reading servo tracks of a magnetic recording tape. The differential position value is compared to a previously-calculated differential position value. An action is performed in response to determining that the difference between the differential position value and the previously-calculated differential position value is in a predefined range.

In another general embodiment, an apparatus includes a magnetic head having at least two servo readers, and a controller in communication with the servo readers. The controller is configured to detect a sudden change in a width of a magnetic recording tape based on a differential position value derived from relatively more current servo readback data and a second differential position value derived from relatively older servo readback data.

In yet another general embodiment, a computer program product for detecting tape damage includes a computer readable storage medium having program instructions embodied therewith, the program instructions executable by a controller to cause the controller to perform the foregoing method.

Figure 1A:
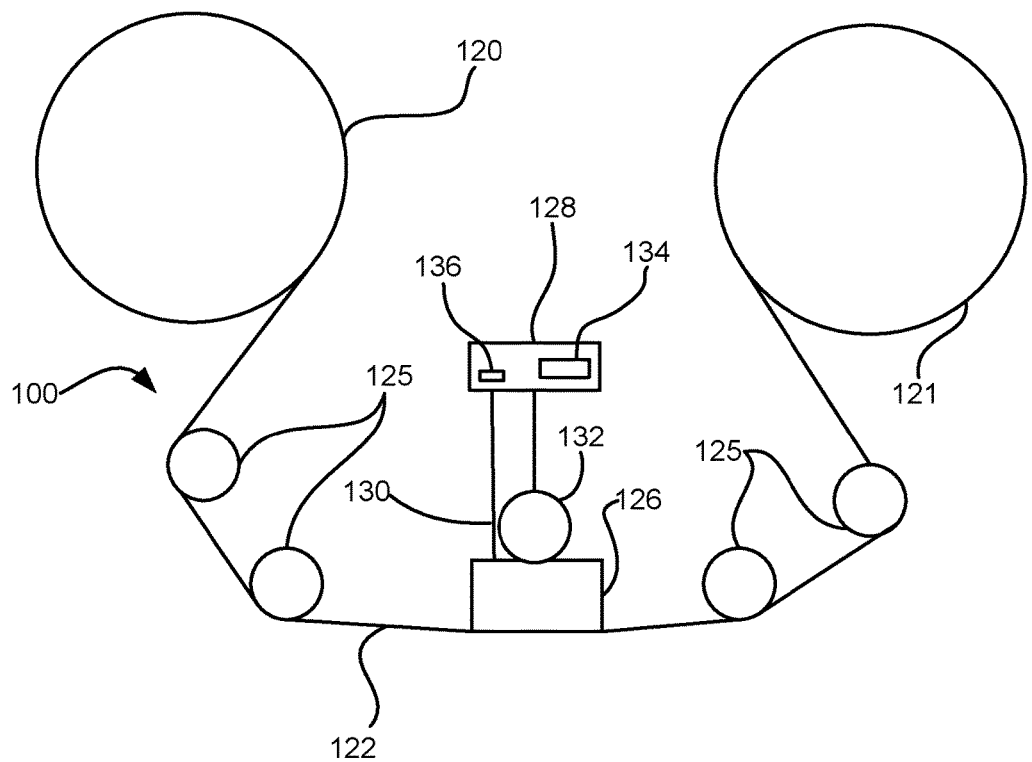
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
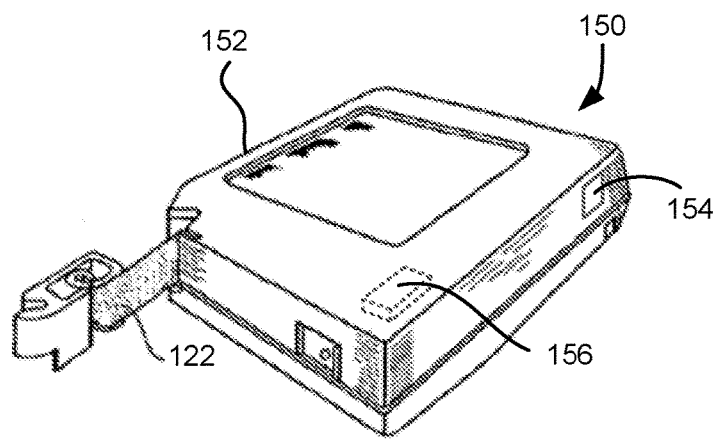
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
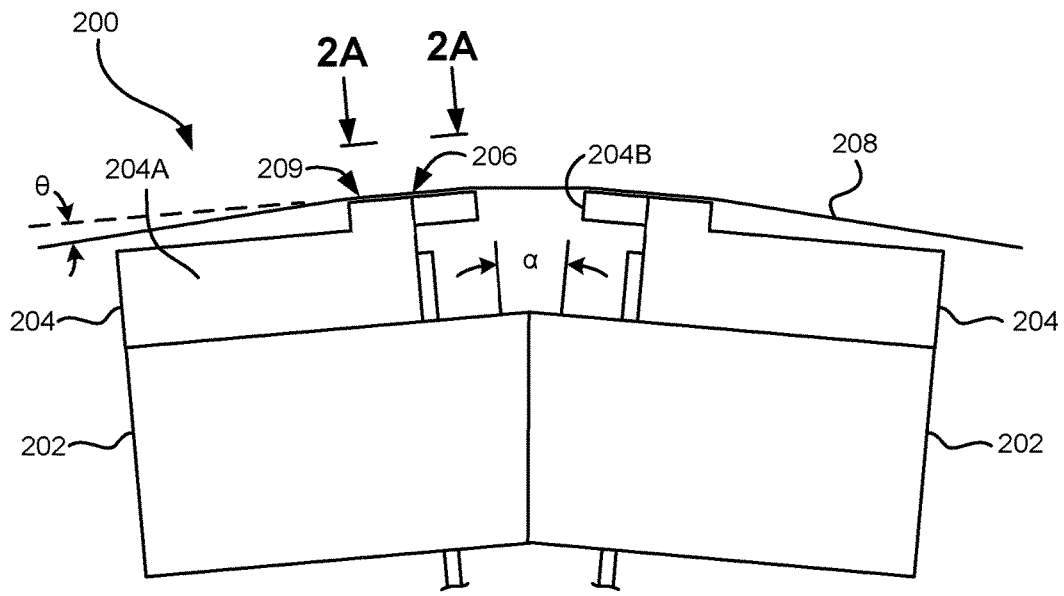
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
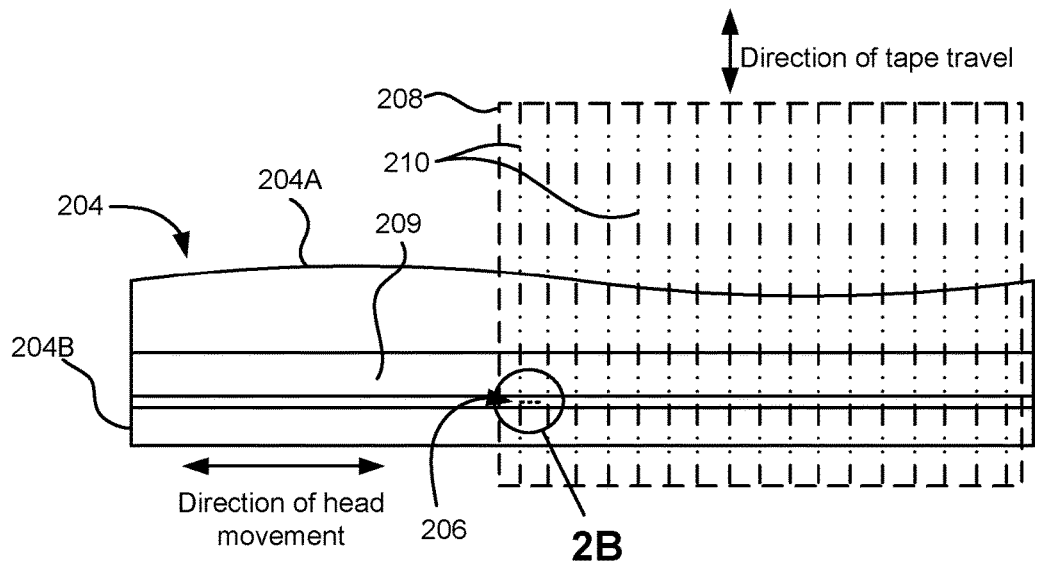
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
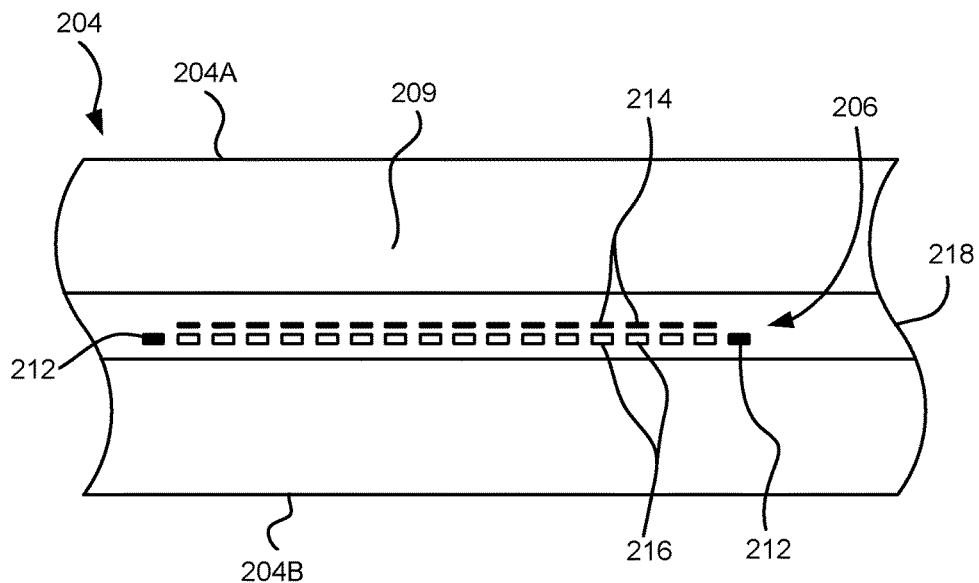
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
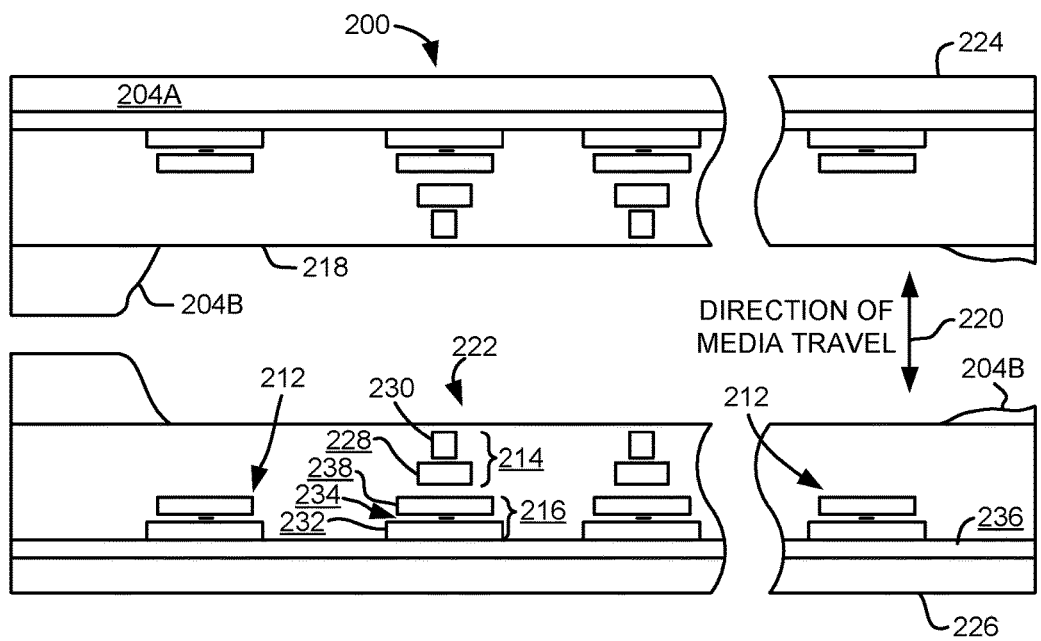
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
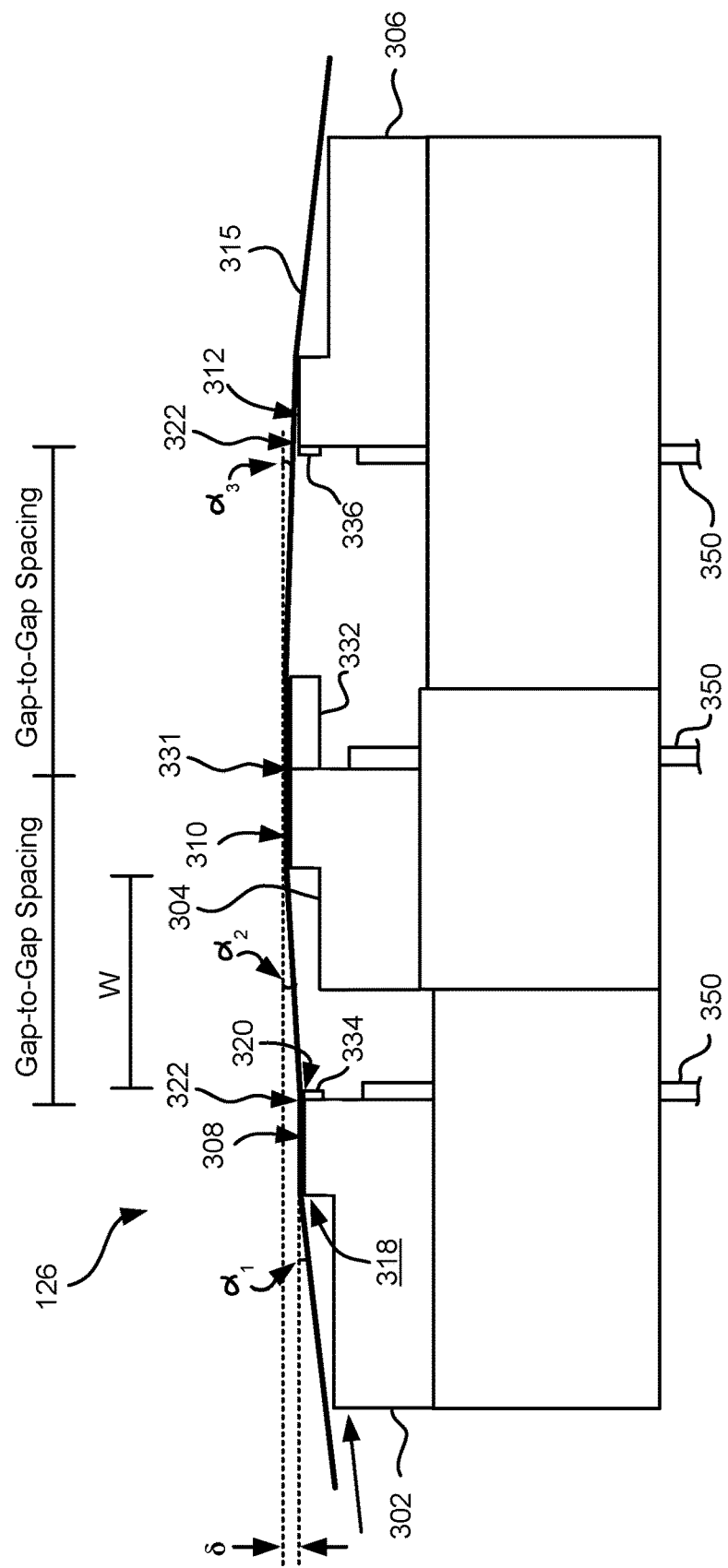
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
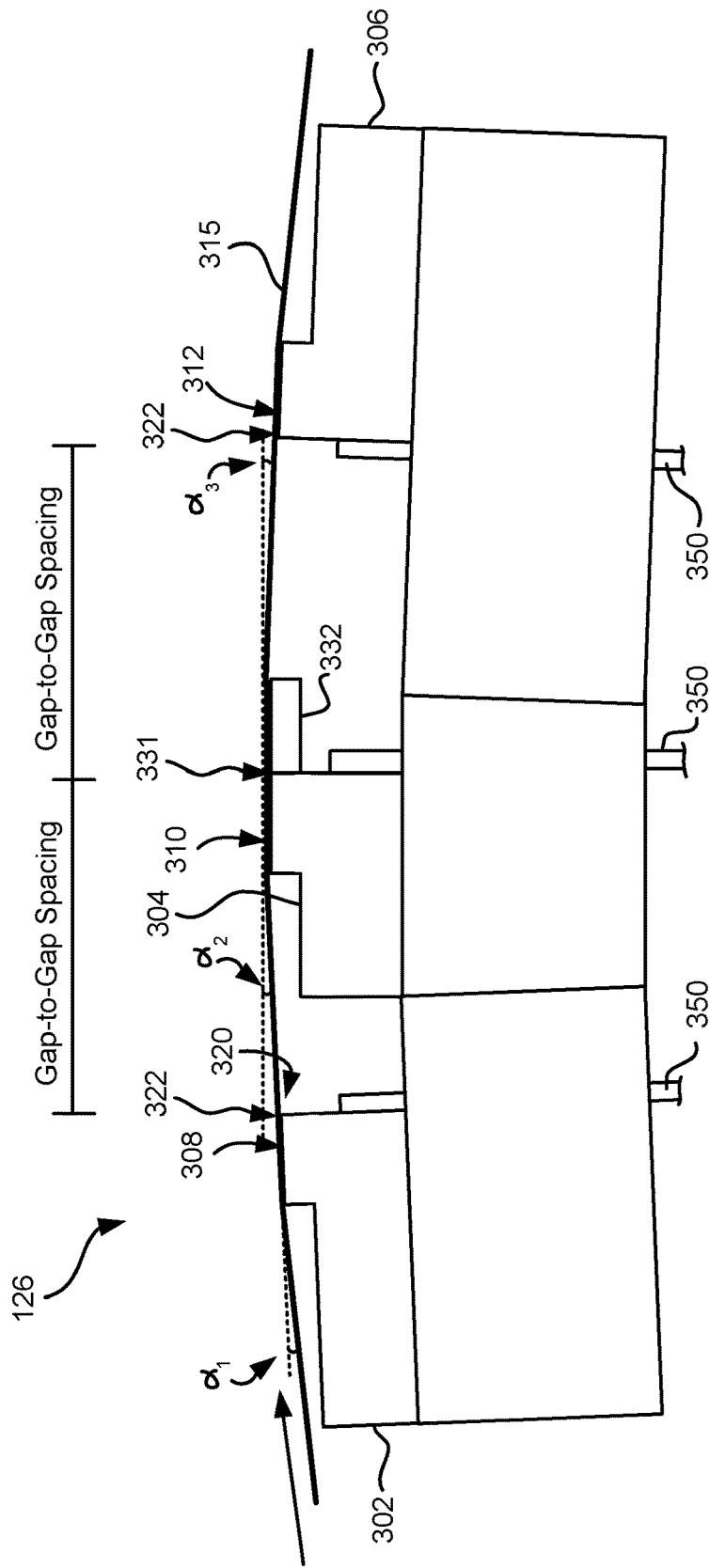
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
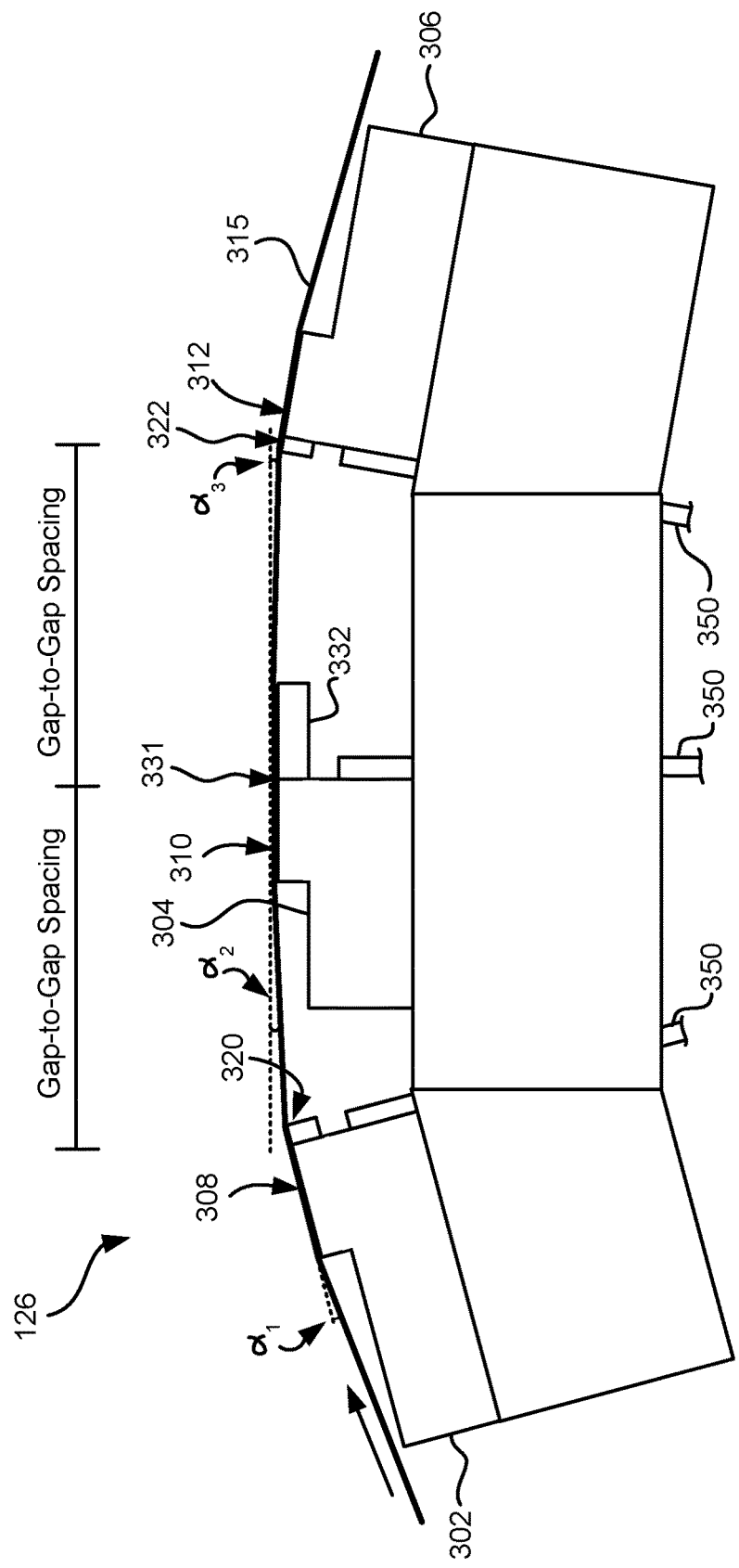
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

It is an ongoing goal to increase storage capacity per unit area of storage medium. One way to achieve such increase is through aggressive track density scaling. As track densities increase, positioning of the recording head over the data tracks by the track follow system of tape drives becomes more important. The basic function of the track-follow control system is to reduce the misalignment between the tape and the recording head created by lateral motion of the flexible medium. Lateral tape motion (LTM), for example, arises primarily from imperfections in the tape guide rollers and reels, such as run-outs, eccentricities and other tape path imperfections. Another source of media imperfection that can cause the head to become misaligned with data is contraction of the media due to tape stretching, which causes the width of the tape to shrink in the stretched area. While tape stretching may cause media width to shrink by only a few microns, this phenomenon has heretofore been very problematic for the track following servo system.

Tape stretching is generally distinguishable from tape lateral contraction due to changes in humidity and temperature in that tape stretching generally only affects a portion of the tape, while humidity and temperature tend to affect the width of the tape as a whole. Moreover, humidity and temperature-induced effects tend to occur slowly, making them easier to deal with. In contrast, instantaneous tape stretching can occur, e.g., due to tension variations, causing stretched portions of tape to appear seemingly at random in some cases. More problematic, however, is permanent stretching damage found in discrete portions of the tape. The transitions between stretched and unstretched regions of the tape tend to be very short, e.g., less than 5 meters long, and often within 1 meter. In either case, the resultant change in width of the stretched portion tends to be observed suddenly with little time for remedial action. Solutions for dealing with tape lateral contraction due to changes in humidity and temperature are generally unsatisfactory for dealing with regions of stretched tape.

Similarly, some tapes have been observed to exhibit regions of excessive expansion, which presents similar challenges. Likewise, solutions for dealing with tape lateral expansion due to changes in humidity and temperature are generally unsatisfactory for dealing with smaller expanded regions of tape.

Various embodiments of the present invention provide a methodology for detecting a defect area of tape such as an area having a tape stretched condition or an expanded condition, and optionally stopping the write/read operation during the defect area and re-enabling the write/read function after the defect area. In one embodiment, a sudden change in a width of a magnetic recording tape is detected based on a differential position value derived from relatively more current servo readback data and a second differential position value derived from relatively older servo readback data. See, e.g., FIG. 10 and related description. The sudden change in width is indicative of a stretching or expansion of only a portion of the magnetic recording tape, as opposed to the entire tape as would be seen with humidity and/or temperature-induced contraction or expansion. The sudden change in width may be detected within a single continuous read operation and/or single continuous write operation.

For simplicity, much of the following discussion will refer to a stretched area of tape. It should be understood that the principles described herein may be applied to expanded areas of tape as well.

Figure 8:
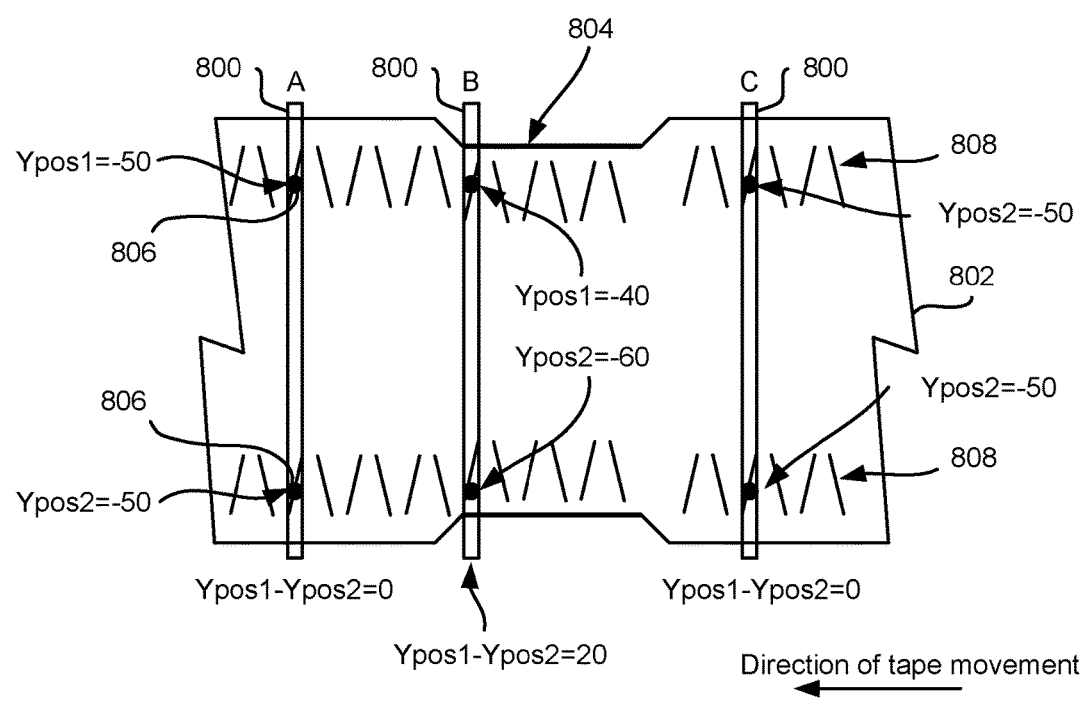
FIG. 8 is a representational diagram depicting a magnetic head relative to a magnetic recording tape having a damaged portion.

FIG. 8 depicts a magnetic head 800 passing over a stretched area 804 of tape 802, in accordance with one embodiment. As an option, the present magnetic head 800 may be implemented in conjunction with features from any other embodiment listed herein, such as those described with reference to the other FIGS. Of course, however, such magnetic head 800 and others presented herein may be used in various applications and/or in permutations which may or may not be specifically described in the illustrative embodiments listed herein. Further, magnetic head 800 presented herein may be used in any desired environment.

As shown, the magnetic head has two servo readers 806 that are used to detect the position of the magnetic head 800 relative to the servo tracks 808 on the magnetic recording tape 802. At position A, the magnetic head 800 is over an unstretched portion of tape. The servo system determines that the two servo readers 806 are at about the same relative position Ypos on each servo track 808, as would be expected under normal conditions. In this example, Ypos1=Ypos2=−50. Taking the difference between the two Ypos readings at position A results in DeltaY=Ypos1−Ypos2=−50−(−50)=0.

When the magnetic head 800 encounters the stretched portion 804 of the tape 802 at position B, where the width of the tape has been reduced thereby causing the servo tracks to become closer together, the signal from the upper servo reader indicates that it is at a higher position: Ypos1=−40, while the signal from the lower servo reader indicates that it is at a lower position: Ypos2=−60. Taking the difference between the two Ypos readings at position B results in DeltaY=Ypos1−Ypos2=−40−(−60)=20. The offset represented by DeltaY is indicative of a problem with this area of tape. Various embodiments take some action based on the magnitude of the offset, e.g., when the DeltaY value is in some range e.g., above some threshold, or equivalently, outside of some range. Selection of a range allows the system to take action only when the stretching or expansion of the tape is at a problematic level. For example, a range may be selected to take action only upon detecting areas of permanent stretching, as opposed to temporary stretching due to tension variations, which tend to be minimal.

When the magnetic head 800 passes by the stretched area 804 of the tape at position C, the servo system determines that the two servo readers 806 are again at about the same relative position Ypos on each servo track 808. DeltaY again equals 0. Of course, the conventions by which the Ypos values may be calculated and/or represented may vary from implementation to implementation. One skilled in the art, armed with the teachings herein, would be able to reproduce the various embodiments described using any conceivable Ypos convention.

Various embodiments detect a damaged region of tape by observing DeltaY.

Figure 9:
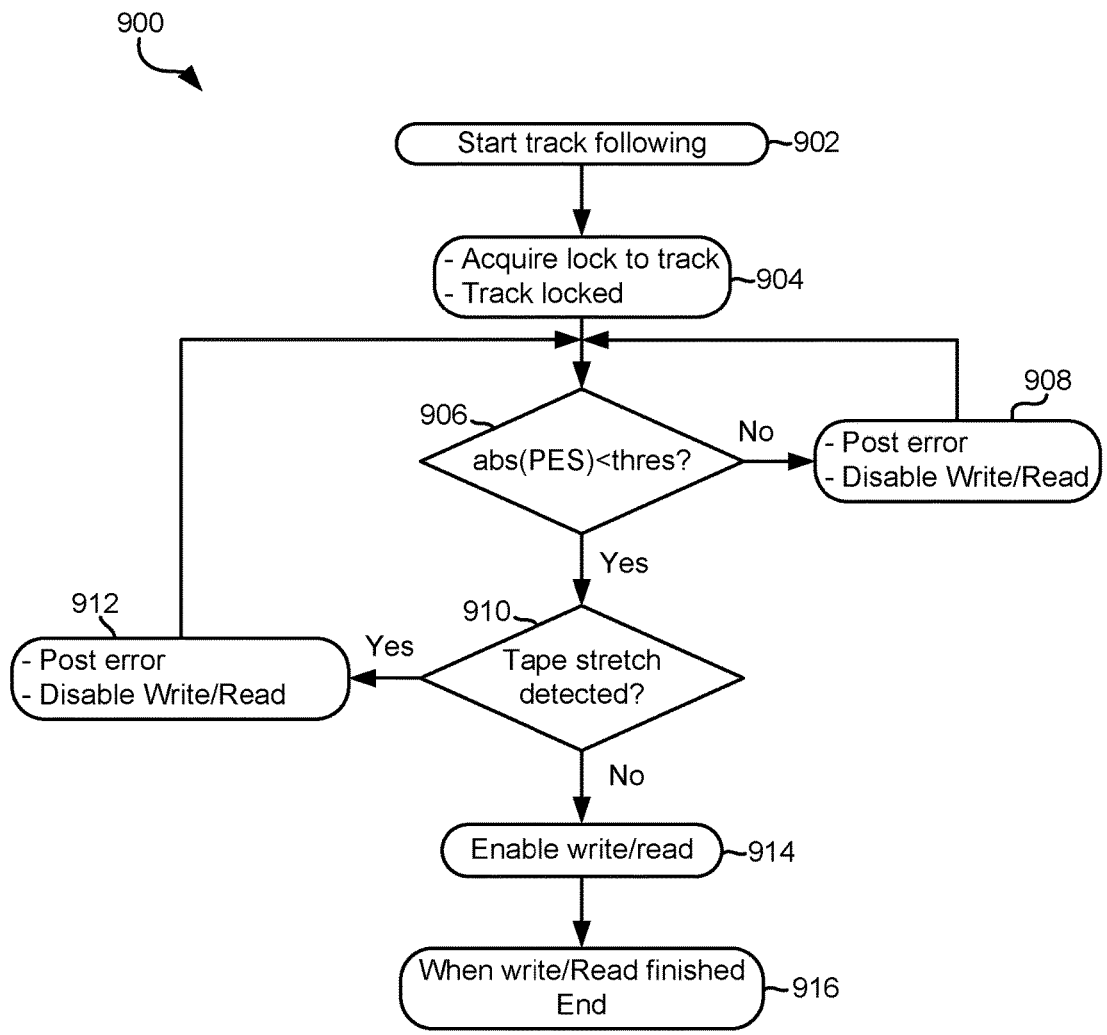
FIG. 9 is a flow chart depicting a process according to one embodiment.

Now referring to FIG. 9, a flowchart of a method 900 is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by a tape drive controller or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where track following is started in a conventional manner.

In operation 904, the servo tracks are locked onto, e.g., in a conventional manner. This function may be performed by a track following (servo) subsystem of a tape drive controller.

In optional decision 906, a check may be performed to ensure that the magnetic head is locked to the desired track on tape sufficiently. In the example shown, this may be done by determining that the position error signal (PES) is within a range, e.g., an absolute value of the PES is below some threshold (thres). If the checking operation of decision 906 fails, an action may be performed, such as posting an error, disabling reading and/or writing, etc. See operation 908. The process 900 may then return to operation 906.

If the checking operation of decision 906 succeeds, the process continues. In operation 910, a tape stretched (and/or expanded) condition is detected. In one preferred approach, a defect is noted when an offset (e.g., DeltaY) goes into a range, e.g., above or below a threshold, within a period of time. Illustrative procedures for detecting the tape stretched (and/or expanded) condition are presented below.

If a tape stretched (and/or expanded) condition is detected, an action may be performed, such as posting an error, disabling of reading and/or writing, etc. See operation 912. The process 900 may then return to operation 906, e.g., to determine when to enable reading and/or writing because the damaged portion of the tape has passed.

If a tape stretched (and/or expanded) condition is not detected at decision 910, the process continues. In operation 914, reading and/or writing is enabled, e.g., allowed to continue, and/or re-enabled in response to the determination at decision 910. The process ends at operation 916 when the reading and/or writing operation is finished.

Figure 10:
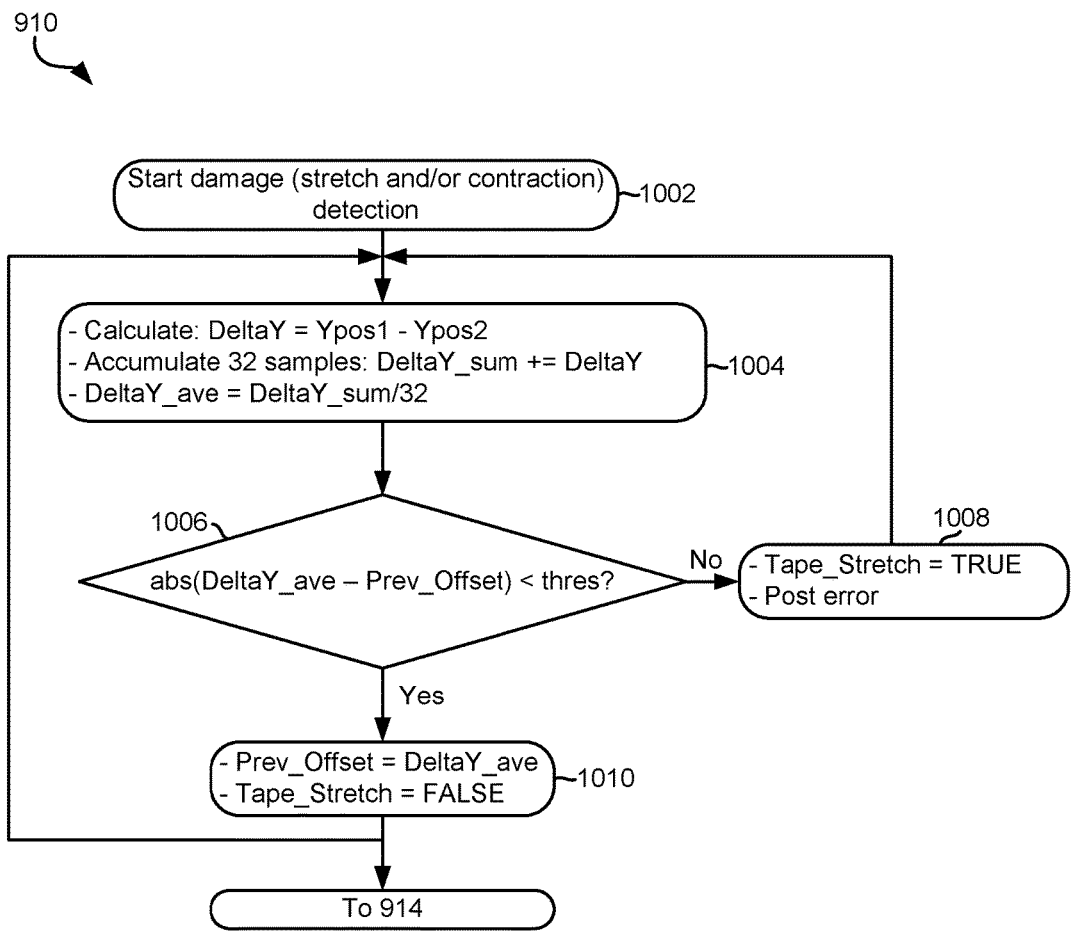
FIG. 10 is a flow chart depicting a process according to one embodiment.

FIG. 10 depicts one illustrative process for performing operation 910 of FIG. 9.

In operation 1002, the process starts, e.g., in response to receiving a read and/or write command. In operation 1004, differential position value DeltaY is computed. In one approach, a DeltaY is computed periodically. In a preferred approach, however, DeltaY is computed for each of a set of samples based on readback signals from at least two servo readers of a magnetic head reading servo tracks of a magnetic recording tape. See, e.g., the description of FIG. 8, above. The number of samples may be any desired number N, such as 2, 4, 8, 10, 16, 32, 64, etc. The number of samples may be predefined, determined during operation, set by a user, etc. In the example shown, 32 samples are used. The DeltaY values for the N samples are added together to obtain DeltaY_sum. Then DeltaY_sum is divided by N to obtain the average differential position value DeltaY_ave for the set of samples.

In operation 1006, the differential position value is compared to a previously-calculated differential position value, e.g., as determined in a previous iteration of operation 1004. Continuing with the preferred embodiment that uses average differential position values, the average differential position value DeltaY_ave calculated in operation 1004 is compared to a previously-calculated average differential position value Prev_Offset. Prev_Offset may be an average differential position value calculated in the iteration of the process performed immediately prior to calculating DeltaY_ave.

An action may be performed in response to determining that the difference between the differential position value and the previously-calculated differential position value is in a predefined range such as above or below a predefined threshold (thres), which may be predefined, set by a user, in microcode, etc. Preferably, the threshold is based on some extent of contraction or expansion of the tape, such as greater than 0.75 cm, greater than 1 cm, etc.

Referring to FIG. 10, where the absolute value of DeltaY_ave−Prev_Offset is greater than a threshold value, which indicates the encounter of a damaged (e.g., stretched or expanded) portion of tape such as a sudden change in the width of the magnetic recording tape, the action taken may include setting a Tape_Stretch flag to TRUE, disabling reading and/or writing, outputting an indication of an error, etc. See operation 1008. The process 910 may return to operation 1004, where the process 910 is repeated to determine when the damaged portion of tape has passed and reading and/or writing can resume.

Where the absolute value of DeltaY_ave−Prev_Offset is in the range less than a threshold value, the Prev_Offset may be reset to the DeltaY_ave calculated in the present iteration and stored in a buffer, a Tape_Stretch flag may be set to FALSE, etc. See operation 1010. The process 910 may then return to operation 1004, and operation 914 of FIG. 9 may be conducted.

Process 910 is preferably performed continuously during a given continuous reading and/or writing operation, thereby enabling rapid detection of damaged portions of tape. However, various components of the process may be delayed, staggered, etc. such as by using every other sample, inserting a delay in the return to operation 1004 from operation 1010, etc. Various embodiments may look for a change in width to occur within a short time period, e.g., in less than about 1 second at normal operating speeds, in less than about 500 milliseconds, etc. Again, other causes of tape lateral expansion and contraction occur slowly. Preferred embodiments discriminate between these and damaged portions of tape based on the short time period in which the change in offset is detected.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
calculating a differential position value based on readback signals from at least two servo readers of a magnetic head reading servo tracks of a magnetic recording tape;
comparing the differential position value to a previously-calculated differential position value; and
performing an action in response to determining that the difference between the differential position value and the previously-calculated differential position value is in a predefined range,
wherein the differential position value is an average of differential position values for a set of samples, wherein the previously-calculated differential position value is an average of previously-calculated differential position values for a set of previously-obtained samples.

2. A method as recited in claim 1, wherein the difference being in the predefined range is indicative of a stretching of only a portion of the magnetic recording tape.

3. A method as recited in claim 1, wherein the difference being in the predefined range is indicative of an expansion of only a portion of the magnetic recording tape.

4. A method as recited in claim 1, wherein the previously-calculated differential position value is calculated immediately prior to calculation of the differential position value compared thereto.

5. A method as recited in claim 1, wherein the calculating and comparing are performed repeatedly, where the calculated differential position value is used as the previously-calculated differential position value in the immediately subsequent comparison.

6. A method as recited in claim 1, wherein the action includes at least one action selected from the group consisting of: outputting an indication of an error, disabling reading, and disabling writing.

7. An apparatus, comprising:
a magnetic head having at least two servo readers; and
a controller in communication with the servo readers, the controller being configured to detect a sudden change in a width of a magnetic recording tape based on a differential position value derived from relatively more current servo readback data and a second differential position value derived from relatively older servo readback data,
wherein the differential position value is an average of differential position values for a set of samples, wherein the second differential position value is an average of previously-calculated differential position values for a set of previously-obtained samples.

8. An apparatus as recited in claim 7, wherein the sudden change in width is detected within a single continuous read operation and/or single continuous write operation.

9. An apparatus as recited in claim 7, wherein the sudden change in width is indicative of a stretching of only a portion of the magnetic recording tape.

10. An apparatus as recited in claim 7, wherein the sudden change in width is indicative of an expansion of only a portion the magnetic recording tape.

11. An apparatus as recited in claim 7, wherein the controller is configured to calculate the second differential position value immediately prior to calculating the differential position value compared thereto.

12. An apparatus as recited in claim 7, wherein the controller is configured to repeatedly attempt to detect a sudden change in the width of the magnetic recording tape during operation of the apparatus.

13. An apparatus as recited in claim 7, wherein the controller is configured to, in response to detecting the sudden change in the width of the magnetic recording tape, perform at least one action selected from the group consisting of: output an indication of an error, disable reading, and disable writing.

14. A computer program product for detecting tape damage, the computer program product comprising a computer readable storage medium having program instructions embodied therewith, the program instructions executable by a controller to cause the controller to perform a method comprising:
calculating, by the controller, a differential position value based on readback signals from at least two servo readers of a magnetic head reading servo tracks of a magnetic recording tape;
comparing, by the controller, the differential position value to a previously-calculated differential position value; and
performing, by the controller, an action in response to determining that the difference between the differential position value and the previously-calculated differential position value is in a predefined range,
wherein the difference being in the predefined range is indicative of a stretching or an expansion of only a portion of the magnetic recording tape.

15. A computer program product as recited in claim 14, wherein the difference being in the predefined range is indicative of a stretching of only a portion of the magnetic recording tape.

16. A computer program product as recited in claim 14, wherein the difference being in the predefined range is indicative of an expansion of only a portion of the magnetic recording tape.

17. A computer program product as recited in claim 14, wherein the differential position value is an average of differential position values for a set of samples, wherein the previously-calculated differential position value is an average of previously-calculated differential position values for a set of previously-obtained samples.

18. A computer program product as recited in claim 14, wherein the calculating and comparing are performed repeatedly, where the calculated differential position value is used as the previously-calculated differential position value in the immediately subsequent comparison.

19. A computer program product as recited in claim 14, wherein the action includes at least one action selected from the group consisting of: outputting an indication of an error, disabling reading, and disabling writing.

* * * * *